J. G. PERRY.
Straw Cutter.
No. 60,550.
Patented Dec. 18, 1866.
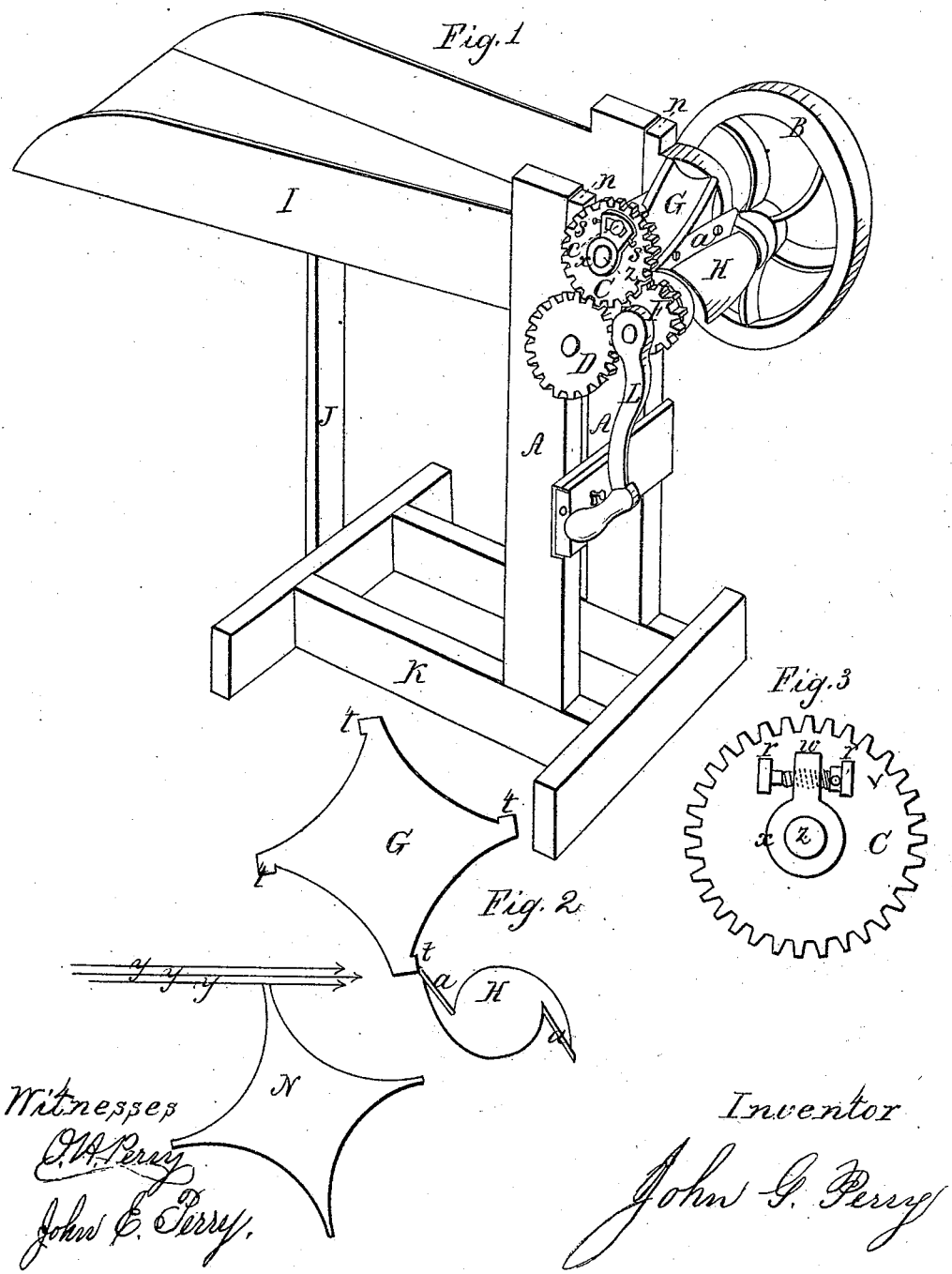

United States Patent Office.

IMPROVEMENT IN STRAW-CUTTERS.

JOHN G. PERRY, OF SOUTH KINGSTON, RHODE ISLAND.

Letters Patent No. 60,550, dated December 18, 1866.

---

The Schedule referred to in these Letters Patent and making part of the same.

---

TO ALL WHOM IT MAY CONCERN:

Be it known that I, JOHN G. PERRY, of South Kingston, in the county of Washington, in the State of Rhode Island, have invented new and useful Improvements in Hay-Cutters; and I do hereby declare that the following is a full and correct description thereof, reference being had to the accompanying drawings, forming part of this specification, and to letters of reference marked thereon, similar letters denoting the same parts in all the figures.

Figure 1 is a perspective view of the machine.
Figure 2 is a cross-section of the rolls or cylinders, showing their relative position.
Figure 3 shows a mode of setting the wheel on cylinder G.

The construction of my cutter is as follows: A base-frame, K, with two front standards, A A, and one back standard, J, which support a horizontal feed-trough, I, at the front end of which is placed the cutting apparatus, which consists of two flanged rolls or cylinders, G, H, and a third one, N, called the feed-roll, the relative position of which may be seen in fig. 2. H is the knife-cylinder; G is a cylinder, by the flanges of which the knives pass in cutting. These two cylinders are geared together by the wheels C F, the wheel F being fast on its shaft, while the wheel C is not, but is held in its proper position by the two set-screws, $s$ $s$, which screw through the arms of the hub $x$, which is fast on its shaft, $z$. These two set-screws press against the stud-screw $e$, in the wheel, and by loosening one of the screws, and tightening the other, the cylinder may be turned, and its flanges moved to or from the knives in the other cylinder. A variation of this arrangement is shown in fig. 3, in which the two studs $r$ $r$ are fast to the wheel C, and the arm, $w$, of the hub, which is fast to the shaft, is moved between the studs by means of the screw $v$, which screws through it. The feed-roll N is carried by a gear-wheel, D, on its shaft, which meshes into wheel C. By examination of fig. 2, it will be seen that the cut of the knife $a$ is made square across the direction of the feed, which is represented by the arrows $y$ $y$; this is its distinguishing feature and advantage over other flanged cylinder machines, which cut almost directly in the line of the feed, and which, consequently, when the sharp edges of the knives are a little dulled, allow the hay to pass through without cutting it. This trouble is almost wholly avoided by making the cut square across or through the hay. Cutters have been constructed with two feed-rolls, but great inconvenience has been experienced from the hay getting wound up around them; this difficulty I have obviated. I use but one feed-roll, which lessens the cost, and place this one in such a position that the knives pass so close to it as to prevent any collection of the hay around it. L is a crank for turning the machine by, and a balance-wheel, B, is placed on the other end of the shaft, to equalize the motion. The cylinders G and H are so constructed and geared together, that the periphery of the flanges on the cylinder H shall move faster than those of the cylinder G, and being so situated in regard to each other, that the direction of the cut shall be radial to or in the direction of the centre of the shaft G, instead of tangential thereto.

The operation is as follows: The hay or substance to be cut is put in the trough I, and pressed towards the cylinders, when by turning the crank L, the hay will be drawn in between the feed-roll N and cylinder G, and cut off by the knives $a$ $a$, which pass close to the flanges of the cylinder. These flanges are made with projections, $t$ $t$ $t$, on their sides, (see fig. 2,) to take the wear caused by the friction of the knives against them.

Having thus described my improvements, what I claim, and desire to secure by Letters Patent herein, is—

1. I claim the combination of the two flanged cylinders G and H, so arranged and geared together, that the periphery of the flanges of the cylinder H shall move faster than those on the cylinder G, and be so situated in relation to each other that a sheer cut shall be made in the direction of the centre of the shaft G, or radial instead of tangential thereto, as shown and specified.

2. I claim the feed-roll N, having flanges that work in concert with those on the cylinder G, in combination with one or more cutting cylinders of a hay or feed-cutter, substantially as herein described, and for the purposes set forth.

3. I claim making the flanges against which the knives cut with projections, $t$ $t$ $t$ $t$, substantially as herein set forth, and for the purposes specified.

4. I claim the hub $x$, screws $s$ $s$, and stud $e$, in combination with the wheel C and cylinder G, substantially as herein described, and for the purposes set forth.

JOHN G. PERRY.

Witnesses:
O. H. PERRY,
JOHN E. PERRY.